United States Patent [19]

Liekens et al.

[11] Patent Number: 4,994,132
[45] Date of Patent: Feb. 19, 1991

[54] METHOD AND APPARATUS FOR ATTACHING AN INSERT IN A HOLLOW BODY

[75] Inventors: Michel Liekens, Geel, Belgium; Edward T. LeBreton, Mentor; Arthur M. Kepler, Mantua, both of Ohio

[73] Assignee: Essef Corporation, Chardon, Ohio

[21] Appl. No.: 460,850

[22] PCT Filed: May 4, 1989

[86] PCT No.: PCT/US89/01941
§ 371 Date: Feb. 13, 1990
§ 102(e) Date: Feb. 13, 1990

[87] PCT Pub. No.: WO89/10827
PCT Pub. Date: Nov. 16, 1989

[30] Foreign Application Priority Data

May 6, 1988 [BE] Belgium .................. 8800508

[51] Int. Cl.5 ............... B29C 33/14; B29C 41/04; B29C 41/30
[52] U.S. Cl. ................... 156/245; 156/303.1; 156/293; 264/249; 264/268; 264/274; 264/275; 264/310; 425/185; 425/186; 425/125; 425/429; 425/435; 425/517; 249/97
[58] Field of Search ............ 264/259, 267, 268, 274, 264/270, 275, 278, 248, 249, 310, 311, 318, 40.7; 425/185, 186, 125, 126.1, 117, 517, 520, 425, 435, 429; 156/303.1, 304.5, 245, 293; 249/97

[56] References Cited

U.S. PATENT DOCUMENTS

| 1,949,473 | 3/1934 | Hopkinson | 264/310 |
| 2,153,184 | 4/1939 | Hager | 264/310 |
| 3,100,641 | 8/1963 | Nicholls et al. | 264/310 |
| 3,160,691 | 12/1964 | Chupa | 264/310 |
| 3,299,501 | 1/1967 | Cox | 264/574 |
| 3,759,480 | 9/1973 | Stier et al. | 264/310 |
| 3,875,275 | 4/1975 | Lemelson | 264/310 |
| 4,167,382 | 9/1979 | Freedman et al. | 425/435 |
| 4,518,558 | 5/1985 | Anway et al. | 264/516 |
| 4,589,563 | 5/1986 | Born | 264/516 |
| 4,664,958 | 5/1987 | Jones | 264/310 |

FOREIGN PATENT DOCUMENTS 42-26945 12/1967 Japan .
1186463 4/1970 United Kingdom .

Primary Examiner—Jeffery Thrulow
Assistant Examiner—Mathieu Vargot
Attorney, Agent, or Firm—Pearne, Gordon, McCoy & Granger

[57] ABSTRACT

A method and apparatus for attaching an insert in an opening in a molded thermoplastic body. The insert includes a thermoplastic mounting portion which is fused with the thermoplastic material of the body. The insert is maintained in a spaed position from the opening during the heating portion of the molding cycle and positioned within the opening while the thermoplastic material is still sufficiently hot to fuse with the thermoplastic mounting portion of the insert.

24 Claims, 4 Drawing Sheets

METHOD AND APPARATUS FOR ATTACHING AN INSERT IN A HOLLOW BODY

BACKGROUND OF THE INVENTION AND PRIOR ART

The present invention relates to a method for attaching an insert at least partly composed of thermoplastic material in an opening into a hollow body having at least a portion thereof formed of a thermoplastic material for attachment of the insert. More specifically, the invention is related to a method and apparatus for mounting an insert having a thermoplastic mounting portion in the opening into a molded thermoplastic hollow body.

In accordance with prior art techniques for producing hollow bodies, such as drums or tanks, the body is usually completely fabricated and the insert is then attached using screws and, optionally, a sealing ring. Alternatively, the insert may be welded or glued to the outside of the body over an opening provided in the wall of the body for this purpose.

The foregoing methods are expensive due to the manual labor and expertise required to attach the insert to the hollow body. Also, an insert attached with such methods does not provide a sufficiently tight seal between the body and the insert, especially if the body is to be subjected to internal pressure during its use.

In rotational molding or casting techniques, the complex mold movements, high molding temperatures and long molding cycles are believed sufficiently severe to have heretofore substantially precluded automatic insert assembly techniques. For example, polyethylene drums having about a 2' diameter and a 4' height require about a 15 minute molding cycle at 500° F.

In contrast with the foregoing relatively severe conditions of rotational molding, blow molding of similarly sized drums is done in a stationary mold apparatus using about a 5 minute cycle and a parison temperature of about 300° F. Thus, it has been possible in blow molding techniques to mount an insert for the hollow body opening on the blow pin and, after blowing, to retract the blow pin to cause the insert to contact and fuse with the body wall.

SUMMARY OF THE INVENTION

A method and apparatus are provided for attaching or mounting an insert in an opening in a molded body with fusion of adjacent thermoplastic materials to provide a substantially integral insert and body assembly. The insert is judiciously positioned within the mold cavity to allow wall formation and to avoid deformation or damage of the insert due to the heat emitted by the molten thermoplastic material as the wall is being formed. Following a predetermined cooling and hardening of the molten thermoplastic material, the insert is brought into contact with the thermoplastic wall at the body opening to provide a fused joint therewith.

As indicated above, the insert is brought into contact with the molten thermoplastic material while it is cooling and at a time when it is still somewhat above its processing temperature. In this manner, the thermoplastic material forming the mounting portion of the insert comes into contact with the still hot thermoplastic material and is briefly heated above its processing temperature and surface melting occurs. The mounting portion of the insert thereby fuses with the thermoplastic material of the hollow body, resulting in a very secure bonding without using any separate adhesive material or mechanical form of fixing, such as screws. The phrase "processing temperature" is used herein to refer to the melt temperature of a thermoplastic material, the thermoplastic material being sufficiently soft or molten at such temperature to shape by molding and to fuse with a similar or different thermoplastic material to form a homogeneous or integral joint therewith.

In the present method, the thermoplastic material is spread in a conventional manner over the inner walls of the mold with heating in a layer of almost uniform thickness. The insert is then brought into contact with the still molten or hot thermoplastic material in the mold. After further cooling, the hollow body with the attached insert may be removed from the mold as soon as it is sufficiently hard.

In accordance with the invention, it is necessary to ensure that in a first stage or step the insert is placed in the mold at a first position located a specific distance from the still molten or hot thermoplastic material so that the insert is substantially not deformed or damaged as a result of the heat emitted by the thermoplastic material and possibly the mold itself. In a second stage or step, while the thermoplastic material is cooling and solidifying, the insert is moved to a second position in close contact with the body thermoplastic material so that surface melting of the contacting thermoplastic portion of the insert occurs and a virtually homogeneous or integral unit comprising the insert and hollow body is formed. Subsequently, in a third stage or step, after sufficient solidification or hardening of the hollow body thermoplastic material has occurred, the hollow body with the attached insert is removed from the mold.

The present invention is particularly applicable to rotational molding or casting techniques. This technique involves heating a closed mold containing the necessary quantity of powdered or granular thermoplastic material in an oven while simultaneously rotating the mold about two axes set at right angles to one another in order to evenly distribute the melting thermoplastic material over the inner wall of the mold. As soon as the molten thermoplastic material is evenly distributed over the inner wall, the mold is removed from the oven and the rotating movement is continued until the thermoplastic material is hardened against the inner wall of the mold. The mold is then opened and the hollow body of thermoplastic material may be removed.

The present invention is also useful in connection with the "Rock and Roll" molding or casting technique which differs from rotational molding in that the mold only rotates on a substantially horizontal axis corresponding with the longitudinal axis of the molded part. At the same time, the mold rocks through an angle of about 30° on a horizontal axis which is at right angles to the longitudinal axis. This rocking movement assures that the powdered or granular thermoplastic material is distributed throughout the length of the mold and rotation on the horizontal longitudinal axis assures an even distribution over the circumference of the mold. Gas burners may be mounted along the length of the mold in order to heat and melt the powdered or granular thermoplastic material therein. This technique is especially useful in molding hollow molds of relatively large dimensions, especially when the length is much greater than the width.

The apparatus in accordance with the invention includes a mechanism which makes it possible to mount the insert in a detachable manner inside the mold. The mechanism is operable to move the insert between the first and second positions within the mold cavity.

In an illustrated embodiment, the mechanism comprises a frame which can be fixed to the outside of the mold adjacent the mold opening where the insert is to be attached to the body. The mechanism also includes a moveable element carried on the frame with a guiding member or adaptor cap which can be slid into the mold opening and a support rod which passes through the guiding member. The insert is mounted on a forward end of the support rod. When the movable element is moved on the frame to the first position, the insert is held in the mold at a specific distance from the inner wall. When the movable element is moved to the second position, the insert is moved against the inner wall of the body being molded.

In a particularly effective embodiment of the invention, the support rod projects from the guiding member substantially in line with the axis of the opening. The guiding member and the insert, by means of at least one supporting element for the insert, are mounted coaxially with the support rod.

As indicated, the disclosed method and apparatus substantially eliminate the disadvantages of prior art manual techniques and provide a very simple, rapid and largely automatic method of attaching inserts. The inserts may be of widely diverse shapes and sizes.

DETAILED DESCRIPTION OF THE DRAWINGS

Figure 1:
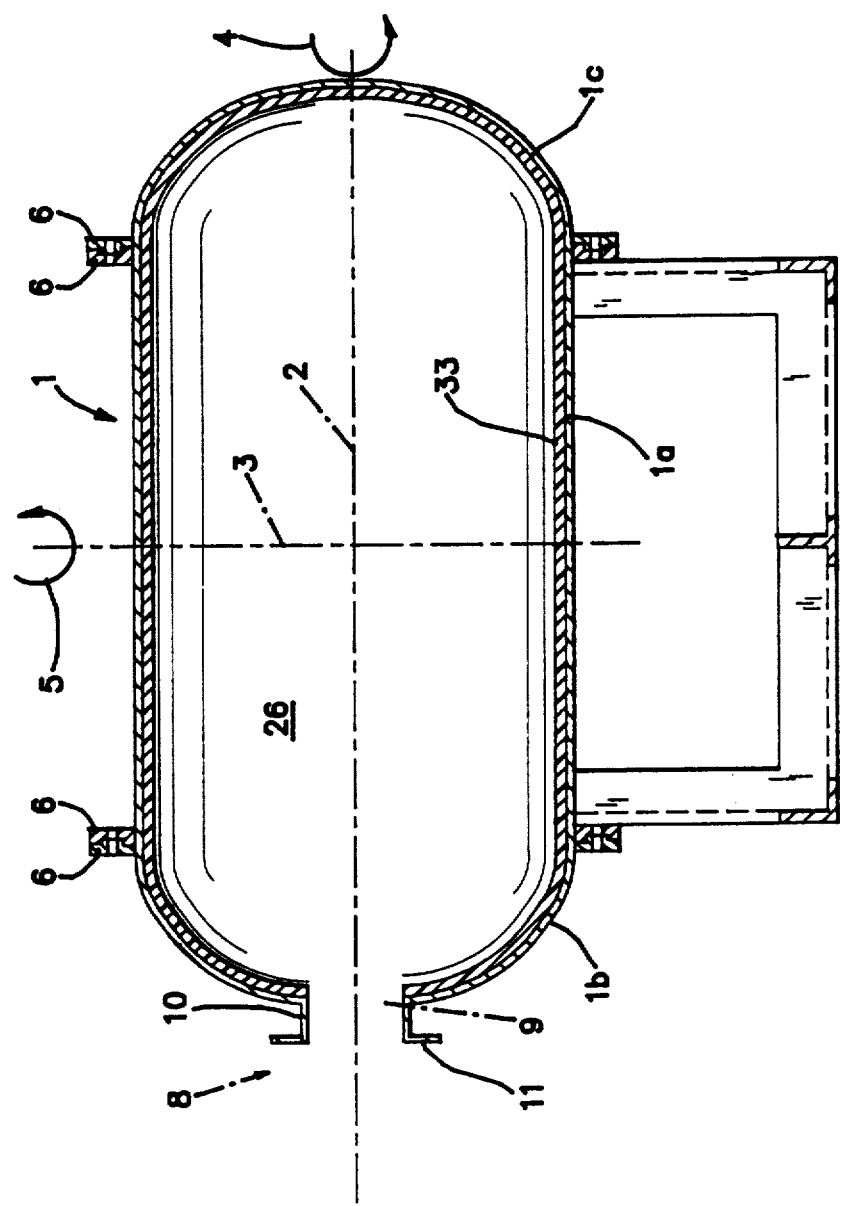
FIG. 1 is a diagrammatic representation of a rotational molding installation including a mold in which a hollow body may be formed and an apparatus in accordance with the invention for attaching an insert to the hollow body.

Referring to FIG. 1, a mold 1 useful in rotational molding is illustrated. Accordingly, the mold 1 is arranged to rotate on its horizontal longitudinal axis 2 and its vertical axis 3 as indicated by the arrows 4 and 5, respectively.

The major components of the mold 1 include a cylindrical middle section 1a, an elliptical top section 1b and an elliptical bottom section 1c. The sections 1a, 1b and 1c are secured together by means of flanges 6 at their connecting edges and fasteners (not shown). The top section 1b of the mold has a circular opening 9 surrounded by an externally raised rim 10 having a flange 11.

The mold 1 is useful for the production of cylindrical pressure vessels having convex ends and a connection opening at one end. The axis of the vessel opening is aligned with the longitudinal axis of the drum and therefore the longitudinal axis 2 of the mold 1. FIG. 1 does not show the conventional drive mechanism for the rotational mold movement nor the heating ovens for melting the thermoplastic material to be used to form the pressure vessel.

Figure 2:
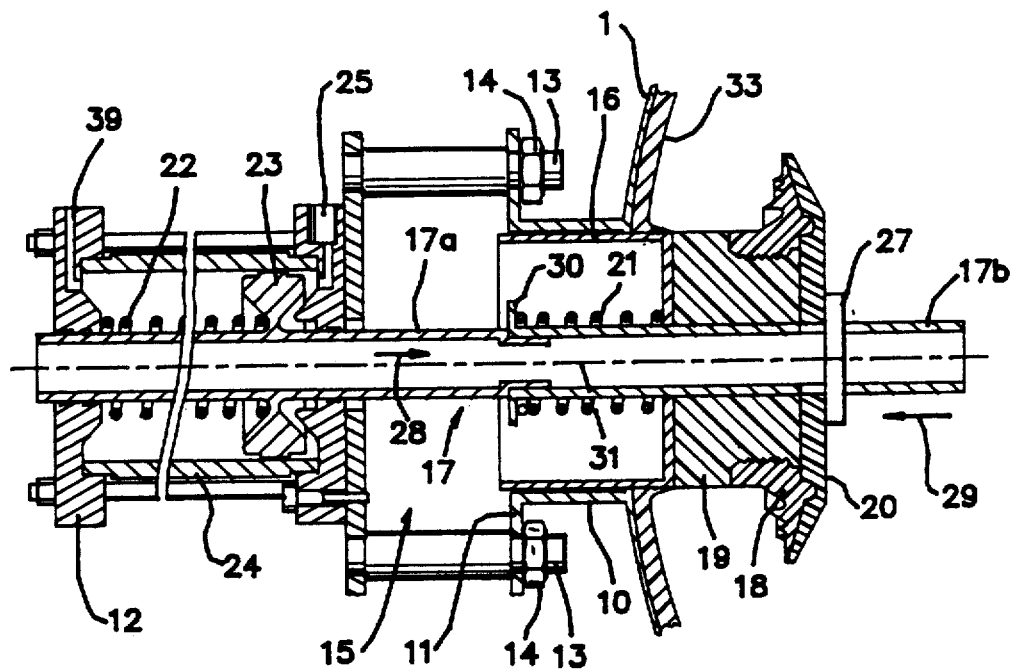
FIG. 2 is a longitudinal sectional view, on a larger scale, of the apparatus shown in FIG. 1, the apparatus being set in the first position.
Figure 3:
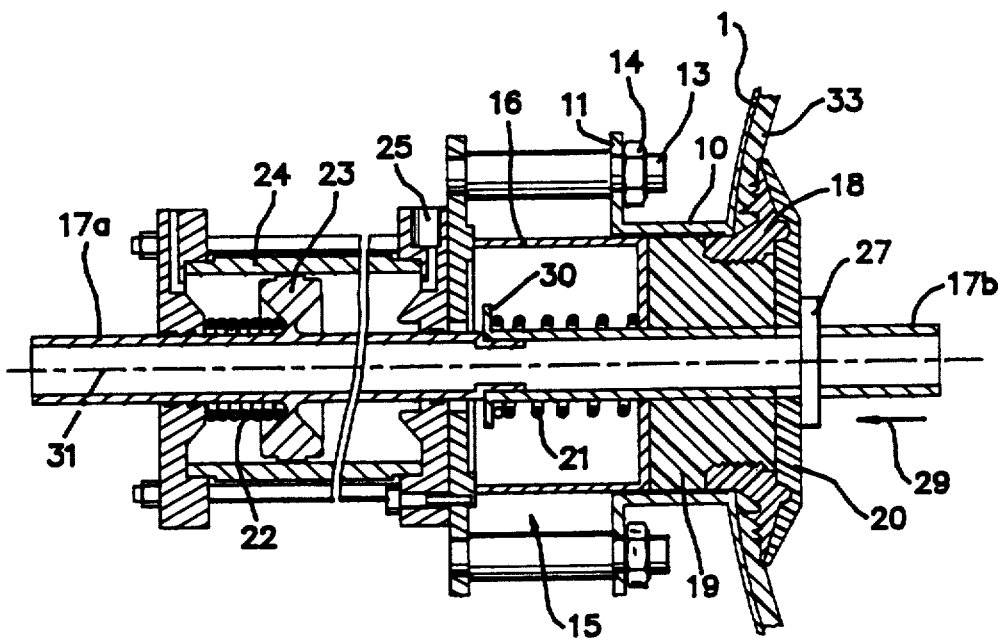
FIG. 3 is a view similar to FIG. 2, except the apparatus is set in the second position.

As shown in FIGS. 2 and 3, the apparatus in accordance with the invention comprises a mechanism 8 on which an insert 18 may be mounted and positioned inside the mold 1. The mechanism 8 comprises a frame 12 which is secured to the flange 11 by bolts 13 and screws 14. A guiding member or adaptor cap 16 is secured to a support rod 17.

The rod 17 includes a rearward part 17a and a forward part 17b which are axially screwed together at joint 31. The forward part 17b of the support rod projects forwardly from the guiding member 16 and carries supporting elements 19 and 20 having the insert 18 mounted therebetween. The support rod 17 is aligned with the axis 2 of the opening 9 and extends through the opening together with the guiding member 16. The support rod 17 is open at both ends in order to vent the cavity or inner space 26 of the mold to the outside atmosphere.

A helicoidal spring 21 biases the guiding member 16 and the supporting elements 19 and 20 with the insert 18 therebetween together. A removable locking pin 27 is attached to the forward end of the rod 17. The spring 21 works against a flange 30 extending from the rod 17 and cooperates with the Pin 27 to entrap the component 16, 18, 19 and 20 therebetween.

The rod parts 17a and 17b may be threadedly disconnected to enable a movable assembly 15 of the mechanism 8 to be removed. The movable assembly 15 includes guiding member 16, insert 18, mounting elements 19 and 20 and retainer spring 27 together with the forward portions 17b of the rod 17.

In the embodiment of FIGS. 1-3, a second helicoidal spring 22 is positioned around the rearward part 17a of the rod 17. The rod part 17a protrudes from the mold 1 and contacts one side of a piston 23 attached to the rod. The piston 23 can be moved to and fro in a cylinder 24 which is fixed to the frame 12.

The cylinder 24 has a supply inlet 25 on the side of the piston remote of the spring for receiving liquid or gas under pressure. Accordingly, the rod 17 may be moved on its axis in the direction of the arrow 28 towards the inside of the mold 1 by means of spring 22. The rod 17 maybe moved in an opposite direction indicated by the arrow 29 by means of gas or liquid under pressure supplied to the cylinder 24 through opening 25 in order to overcome the bias of the spring 22.

Figure 4:
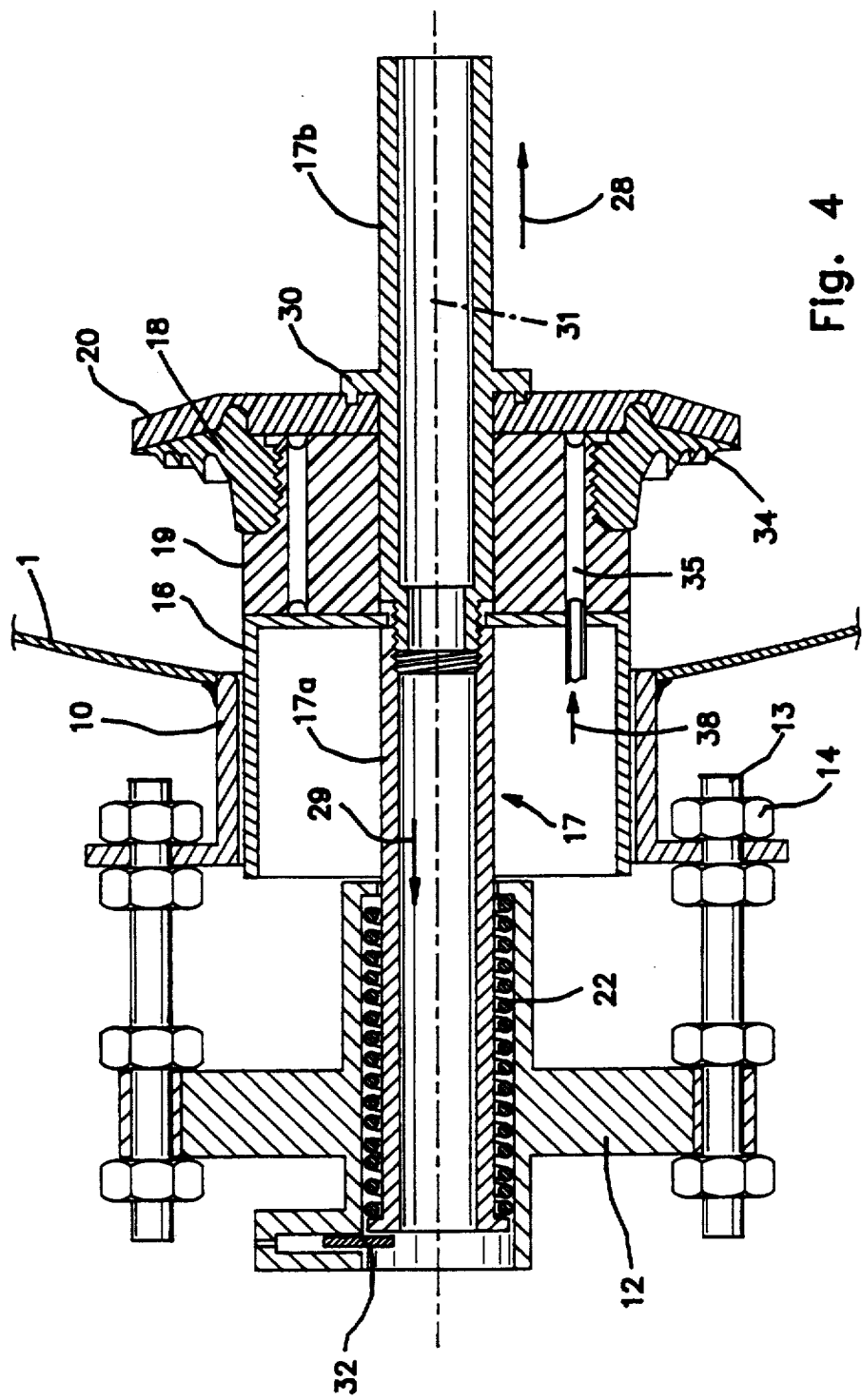
FIG. 4 is a longitudinal sectional view of another embodiment of the apparatus in accordance with the invention, the apparatus being set in the first position.

FIG. 4 illustrates another embodiment of the apparatus in accordance with the invention. This embodiment differs from that described above mainly due to the fact that the apparatus can be operated manually as well as pneumatically. Furthermore, it incorporates a system for cooling the insert which can be applied to the first stage or step of the method according to the invention.

In the embodiment of FIG. 4, a single spring 22 is used to maintain the insert in the first position. The movable parts including the guiding member 16, the supporting elements 19 and 20 together with the insert 18 can be pressed against one another by threadedly engaging the portions 17a and 17b of the rod 17. The spring 22 is maintained in a compressed position by means of a removable locking pin 32. When the pin 32 is removed, the tube 17 is biased by the spring 22 in the direction of the arrow 29 in order to move the insert 18 to the second position.

Figure 5:
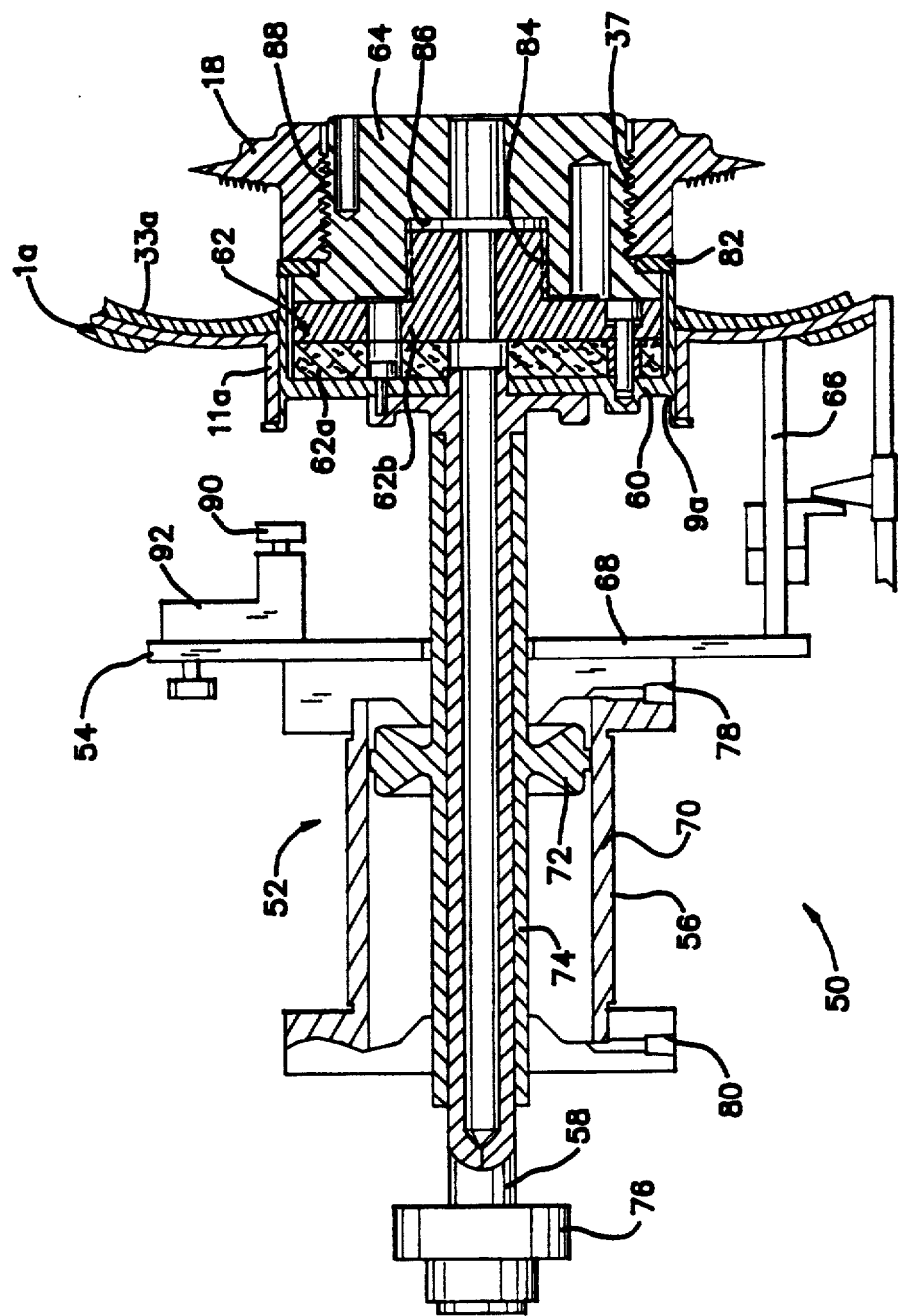
FIG. 5 is a longitudinal sectional view of another embodiment of an apparatus in accordance with the invention, the apparatus being set in the first position.

Referring to FIG. 5, a preferred embodiment of an apparatus 50 in accordance with the invention is shown. The apparatus 50 comprises a mechanism 52 which is similar to the mechanism 8 in construction and operation. The major components of the mechanism 52 include a frame 54, a drive 56, a support or connecting rod 58 a guiding member or adaptor cap 60, an insulator assembly 62 and an insert support 64.

The frame 54 mounts the mechanism 52 to the exterior of a mold 1a adjacent a changeable mold flange-rim 11a and opening 9a. To that end, the frame includes mounting pins 66 (only one being shown) for supporting a spaced mounting plate 68.

The drive 56 is mounted to the plate 68 and includes a cylinder 70 and piston 72. The piston 72 includes a sleeve 74 which receives the rod 58. The forward end of the sleeve 74 adjacent to the mold 1a is attached to the adaptor cap 60. The rearward end of the sleeve 74 is adapted to engage a nut 76 fixed to the rearward end of the rod 58. The piston 72 and sleeve 74 are driven by application of fluid pressure or vacuum to the port 78, the cylinder 70 being vented by port 80.

The adaptor cap 60 is sized to fit within mold opening 9a during the molding process to restrict the flow of thermoplastic material. To that end, a washer 82 which may be formed of a suitable temperature and adhesion resistant plastic such as Teflon is provided adjacent the forward axial end of the adaptor cap 60 to assure a clean separation of thermoplastic material adjacent the end of the insert 18.

In order to reduce the heat transfer to the insert 18 during the molding process, the insulator assembly 62 is used to connect the cap 60 to the insert support 64. The assembly 62 may be a one-piece unit or comprise a plurality of parts such as disc 62a and threaded end connector 62b. The disc 62a and connector 62b are bolted to the adaptor cap 60 and move with the rod 58. The connector 62b is secured to the insert support 64 by threaded connection 84.

The assembly 62 is formed of heat insulating material such as suitable temperature resistant resins, ceramics or metals. For example, the disc 62a is formed of calcium silicate with a kraft paper fiber fill and sold under the brand name Marinite by BNZ Materials, Inc., Englewood, Colo. The connector 62b may be formed of a similar ceramic material or a high temperature resistant plastic such as a phenolic resin. Further, a space 86 is provided between the central forward end of the connector 62b and the insert support 64 to further limit heat transfer to the insert 18.

The insert support 64 is also formed of a suitable thermal insulating material such as phenolic resin. External threads 88 are provided for engagement with internal threads 37 of the insert 18.

The insert support 64 is adapted to remain in engagement with the insert 18 until the latter has sufficiently cooled to avoid dimension changes. Thereafter, the insert support 64 is threadedly disengaged from the insert 18.

The insert support 64 acts as a thermal insulator during the heating cycle of the molding process. However, the insert support 64 may also serve as a heat sink during cooling with heat transfer being from the insert 18 to the insert support 64.

A molding cycle using the embodiment of the apparatus according to the invention as shown in FIGS. 1-3 is described below.

Initially, the necessary quantities of powdered or granulated thermoplastic material for the production of a hollow body, such as a drum, are added to the mold 1. The mechanism 8 is attached to the flange around the mold opening 9 by means of bolts 13 and nuts 14. While the mold 1 is still open, the insert 18 is mounted to the support rod 17 between support elements 19 and 20. The mechanism 8 is arranged so that the insert 18 is supported in the first position within the mold cavity 26.

The mold 1, with the attached mechanism 8, is then placed into the oven to melt the thermoplastic material while the mold is subjected to rotation about both of the axes 2 and 3 during the mold heating step. In this way, a layer 33 of virtually uniform thickness of liquid thermoplastic material is formed against the inner wall of the mold.

The distance between the insert 18 and the layer 33 is such that the insert is not deformed nor damaged as a result of the heat emitted by the molten layer of thermoplastic material. The supporting element 19 prevents the formation of thermal bridges between the insert 18 and the guiding member 16, the latter tending to be of a metallic construction as is the mold 1.

As shown in FIG. 2, the guiding member 16 forms a stop for mold opening 9. More specifically, the guiding member 16 penetrates the mold 1 to a depth which is at least equal to that of the thickness of the layer of thermoplastic material in order to prevent the material from passing through the opening 9.

The mold 1 is then removed from the oven, the rotating motion continuing while it is cooled in the air so that the layer of thermoplastic material gradually begins to harden. Compressed air is then introduced into the cylinder 24 through inlet 25 to cause piston 23 and rod 17 to move rearwardly in the direction of arrow 29. In this manner, the insert 18 is moved to the second position and pressed against the layer of the still soft thermoplastic material 33.

Figure 6:
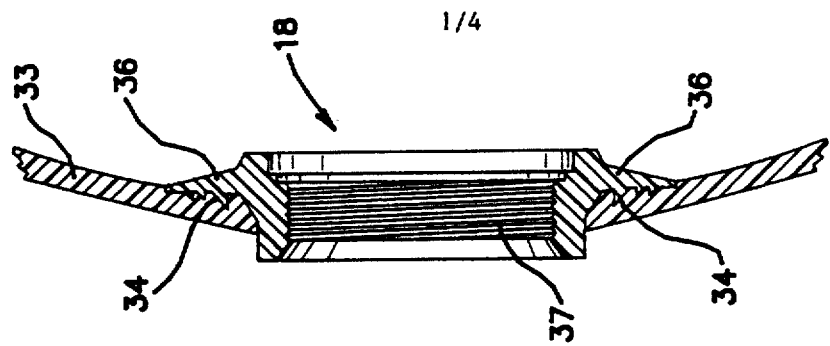
FIG. 6 is a fragmentary sectional view of a hollow body provided with an insert in accordance with the invention.

In this embodiment, the insert 18 consists of a connection or link with internal thread 37 as best shown in FIG. 6. Thus, the insert 18 also includes a collar 36 having annular teeth or ribs 34. In the second position, the teeth 34 and surface of the collar 36 are brought into contact with the still plastic layer 33. Due to the still relatively high temperature of the layer 33, the teeth 34 and surface of the collar 36 are melted.

If the "Rock and Roll" molding or casting technique is used, the above procedure for attaching the insert 18 to the wall 33 of the body is substantially the same and the same apparatus may be employed. The differences in the molding or casting procedure do not materially affect the insert attachment process.

In the embodiment of FIG. 4, the insert 18 is again moved to the first position in the mold as described above. At this time, the spring 22 is held in a compressed position by means of locking pin 32. A cooling channel 35 in the supporting element 19 permits cooling air, as indicated by arrow 38, to be directed into the element 19 during the first stage or step in order to control the temperature of the insert 18.

During the second or cooling stage or step, the locking pin 32 is removed manually, pneumatically or in any other suitable manner. Accordingly, the spring 22 relaxes and the rod 17 moves in the direction of arrow 29 until the guiding member 16 comes into contact with the frame 12. This contact point is adjusted so that the teeth or ribs 34 of the insert 18 press into the soft layer 33 and fused. The remainder of the cycle is the same as described above.

The embodiment of FIG. 5 is used in a manner similar to that described for the foregoing embodiments. In this instance, the washer 82 may be positioned and the insert 18 may be threadedly engaged to the insert support 64 with the mold 1a in an open condition. The mechanism 52 is arranged to dispose the insert 18 in the first position within the mold cavity during the first stage or step of the molding process. Thus, vacuum is applied to the port 78 and the piston advances forward. The position of the insert 18 may be controlled by adjustment of the stop 90 carried on the mounting block 92. In order to cause engagement and fusion of the insert 18 and adjacent wall portion 33a, pressure is applied to the port 78 and the moves rearwardly until the adaptor cap 60 engages the stop 90 carried by the frame 54. Thereafter, the rod 58 is rotated via nut 76 to cause the adaptor cap 60 and insulator assembly 62 to threadedly disengage from the insert support 64. After further cooling and hardening, the insert support 64 may be disengaged from the insert 18.

A preferred thermoplastic material for use in forming the body and insert is polyethylene. The polyethylene may be fiber-filled. Of course, other types of thermoplastic materials may be used.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not limited in scope and effect to the specific embodiments herein shown and described nor in any other way that is inconsistent with the extent to which the progress in the art has been advanced by the invention.

We claim:

1. A method of mounting an insert having a thermoplastic mounting portion at an opening in a body primarily molded of thermoplastic material comprising the steps of providing a mold having a mold opening for forming said body opening and for providing communication with a mold cavity provided by an inner mold wall for shaping said body, said mold cavity containing a charge of thermoplastic material for molding said body, heat said charge of thermoplastic material, distributing molten thermoplastic material over said mold wall, supporting said insert within said cavity in a first position of a predetermined distance from said mold opening and said mold wall, moving said mold to distribute said charge and form said body, moving said insert to a second position with said thermoplastic mounting portion thereof in contact with the molten thermoplastic material while it is sufficiently hot and soft to fuse with the mounting portion of the insert, and cooling and hardening said thermoplastic material and removing the body and mounted insert from the mold.

2. A method according to claim 1, wherein the step of moving said mold includes rotating the mold to cause distribution of the molten thermoplastic material over said inner mold wall.

3. A method according to claim 2, wherein detachable support means carried by said mold are provided to support said insert in said first and second position.

4. A method according to claim 3, wherein said detachable support means also thermally insulates said insert from heat emitted from said molten thermoplastic material adjacent said mold opening during heating of said charge of thermoplastic material.

5. A method according to claim 4, including the steps of maintaining said thermoplastic mounting portion of said insert below its processing temperature when said insert is in said first position, and increasing the temperature of said thermoplastic mounting portion above its processing temperature when said insert is in said second position by transfer of heat from said molten thermoplastic material of said body.

6. A method according to claim 5, wherein said body is substantially composed of thermoplastic material and is molded by rotational molding.

7. A method according to claim 5, wherein said body is substantially or entirely composed of thermoplastic material and is molded by "Rock and Roll" molding.

8. A method according to claim 5, including cooling said insert in said first position by air flow from outside said mold.

9. A method according to claim 5, wherein said thermoplastic mounting portion of said insert includes teeth which are pressed into the molten thermoplastic material when the insert is moved to said second position.

10. A method according to claim 9, wherein said insert includes a collar which fits closely against the layer of molten thermoplastic material which covers said inner mold wall when said insert is moved to said second position.

11. A method according to claim 10, wherein said insert has a cylindrical configuration and a threaded bore.

12. An apparatus for supporting an insert to be joined to a body during the molding of the body in a mold, said mold including a mold cavity provided by an inner mold wall for shaping the body and means to move said mold to distribute molten thermoplastic on the mold wall to shape the body, comprising a mechanism including detachable support means for detachably mounting said insert on said mechanism with said insert disposed within said mold cavity in a first position at a predetermined distance from said mold wall during the distribution of said molten thermoplastic and in a second position in contact with said body to fuse said insert and body together, and moving means operable to move said detachable support means between said first and second positions.

13. An apparatus according to claim 12, wherein said mechanism includes a frame adapted to be mounted to the mold remote of the cavity and adjacent to said mold opening, said moving means being carried by said frame and comprising a movable part including a guiding member which can be slid into said mold opening and a support rod which projects through the guiding member and into the mold cavity, said detachable support means being connected to an end of said support rod within said cavity for detachable connection to said insert.

14. An apparatus according to claim 13, wherein said detachable support means include two support elements adapted to support said insert therebetween.

15. An apparatus according to claim 13, wherein said detachable support means include an externally threaded support element.

16. An apparatus according to claim 15, wherein said guiding member includes a surface which extends through said mold opening into the mold cavity to a depth which is at least equal to the thickness of the layer of thermoplastic material spread over the inner mold wall.

17. An apparatus according to claim 16, wherein said support rod is substantially axially aligned with said mold opening.

18. An apparatus according to claim 17, wherein spring means are provided to bias said support rod toward said mold opening in said second position.

19. An apparatus according to claim 18, wherein said spring means cooperate with a piston mounted within a cylinder carried by said frame, said support rod being attached to said piston for following movement.

20. An apparatus according to claim 17, wherein said moving means comprise a cylinder and piston, and said support rod is connected to said piston.

21. An apparatus according to claim 13, wherein said detachable support means includes at least one thermal insulating member mounted on said support rod between said guiding member and said insert.

22. An apparatus according to claim 21, wherein said at least one thermal insulating member comprises a support element detachably mounted to said support rod and having said insert detachably connected thereto.

23. An apparatus according to claim 22, wherein a second thermal insulating member is carried by said support rod between said guiding member and said first mentioned thermal insulating member.

24. An apparatus according to claim 23, wherein said thermal insulating member is formed of a plastic or a ceramic.

* * * * *